Figure 1:
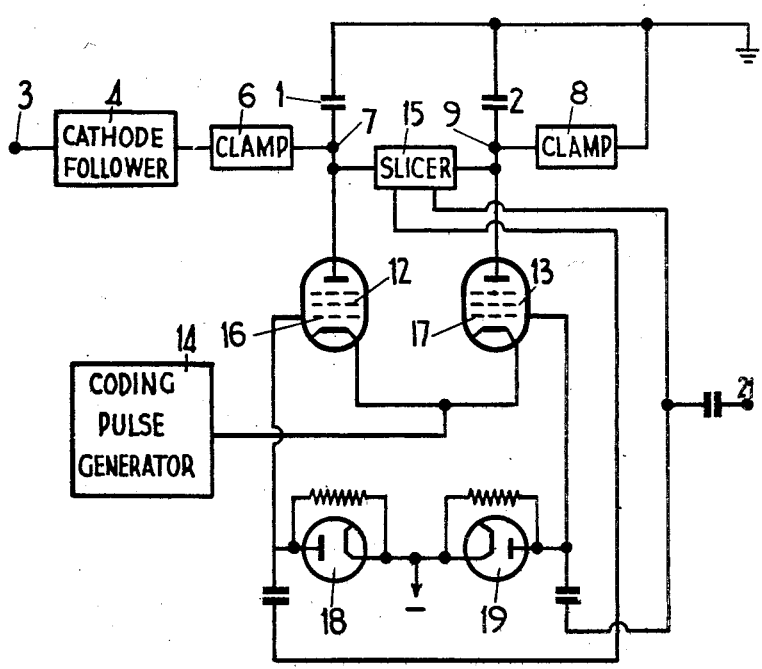

April 30, 1957

D. W. ELSON 2,790,953

ELECTRIC SIGNALLING SYSTEMS OF THE
KIND USING PULSE CODE MODULATION

Filed March 3, 1954

4 Sheets-Sheet 1

INVENTOR
DAVID WILLIAM ELSON

BY
ATTORNEY

000# United States Patent Office 2,790,953
Patented Apr. 30, 1957

2,790,953

ELECTRIC SIGNALLING SYSTEMS OF THE KIND USING PULSE CODE MODULATION

David William Elson, Buckhurst Hill, England, assignor to The General Electric Company Limited, London, England Application March 3, 1954, Serial No. 413,910

Claims priority, application Great Britain March 5, 1953

5 Claims. (Cl. 332—11)

The present invention relates to electric signalling systems of the kind using pulse code modulation. The invention is more particularly concerned with apparatus for generating pulse code signals.

In British patent specification No. 664,401, there is described apparatus for generating a pulse code signal which makes use of two trains of pulses during each coding cycle. These two trains, one of which consists of positive-going pulses while the other consists of negative-going pulses, are such that the amplitude of each pulse in a train is one half that of the preceding pulse, that is to say the amplitudes decrease in geometric progression with a common ratio of one half. The signal to be coded is periodically sampled by means of a clamp circuit and the sample is applied to an integrator circuit. The voltage from the integrator circuit is supplied to a comparison circuit which determines whether or not the instantaneous voltage supplied by the integrator is above or below a fixed datum level. A pulse from one or other of the two trains is then passed to the integrator in dependence upon the determination by the comparison circuit so that if the voltage is below the datum level a positive-going pulse is supplied to the integrator while if it is above the datum level a negative-going pulse is supplied. After supplying such a pulse to the integrator, the comparison circuit again determines whether or not the resulting voltage is above or below the datum level and the operation is repeated for each pulse of the said trains. A pulse element, which in the example is selectively either a pulse or no pulse, is generated as a result of each comparison effected by the comparison circuit. The succession of pulse elements generated in this manner constitutes the pulse code signal.

One object of the present invention is to provide improved apparatus for generating pulse code signals.

According to one aspect of the present invention, apparatus for generating a pulse code signal comprises first and second integrator circuits, means to condition the first integrator circuit to a level dependent upon the instantaneous value of a signal to be coded, means to condition the second integrator circuit to a predetermined level prior to coding, means to generate a train of pulses which decrease in geometric progression with a common ratio of one half, means to compare the levels supplied by the first and second integrator circuits, and means to supply each pulse of said train selectively to one or other of said integrator circuits in dependence upon the result of the comparison effected by the last-mentioned means so that during a coding cycle the difference between the levels supplied by the integrating circuits approach a predetermined value (which may be zero), a pulse element of the generated signal being supplied in dependence upon the result of each comparison.

Preferably each of said integrator circuits consists of storage capacity, for example a condenser, in which case the said train will consist of current pulses, the quantity of electricity in successive pulses decreasing in the ratio two to one.

Figure 2:
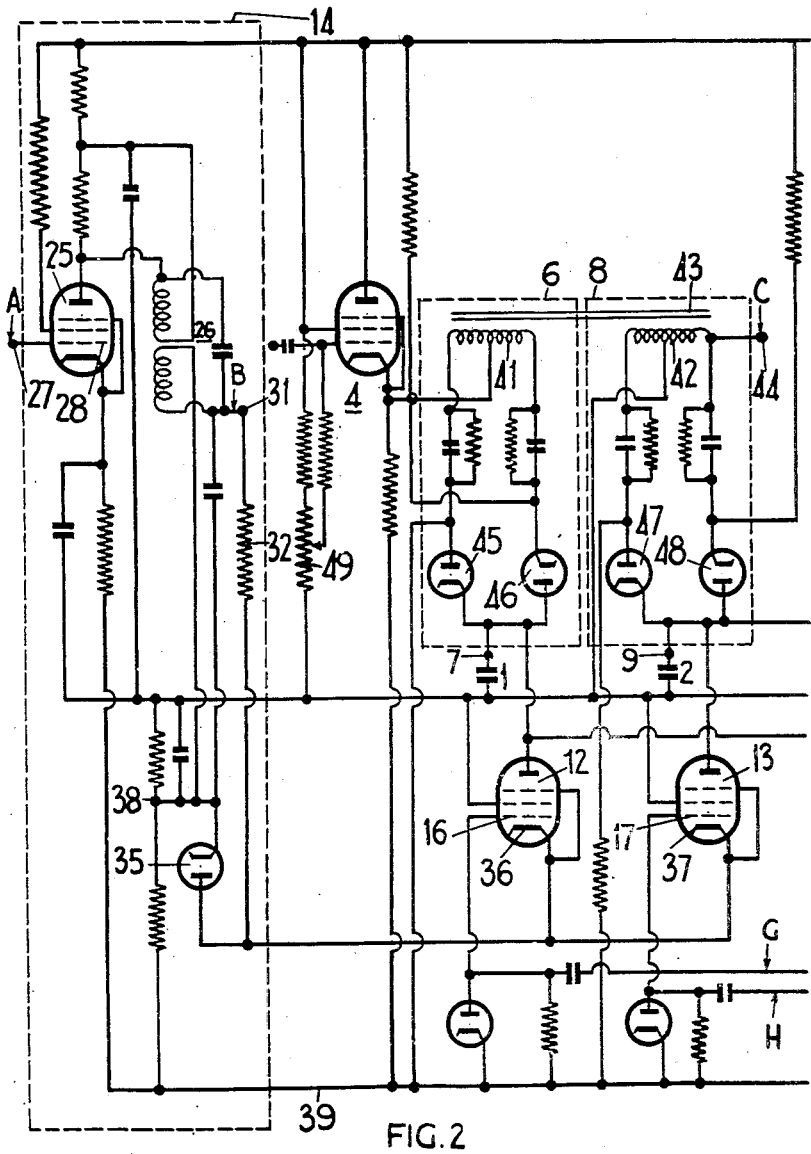
Figure 3:
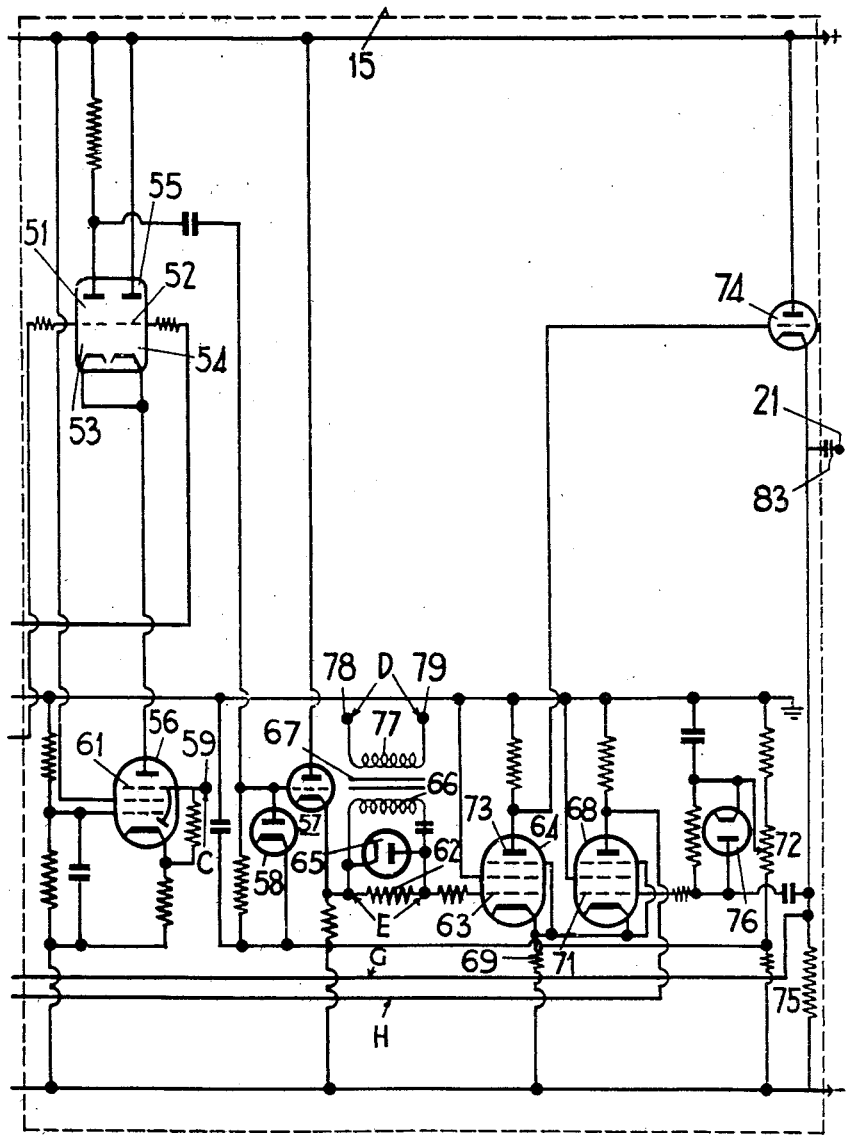
Figure 4:
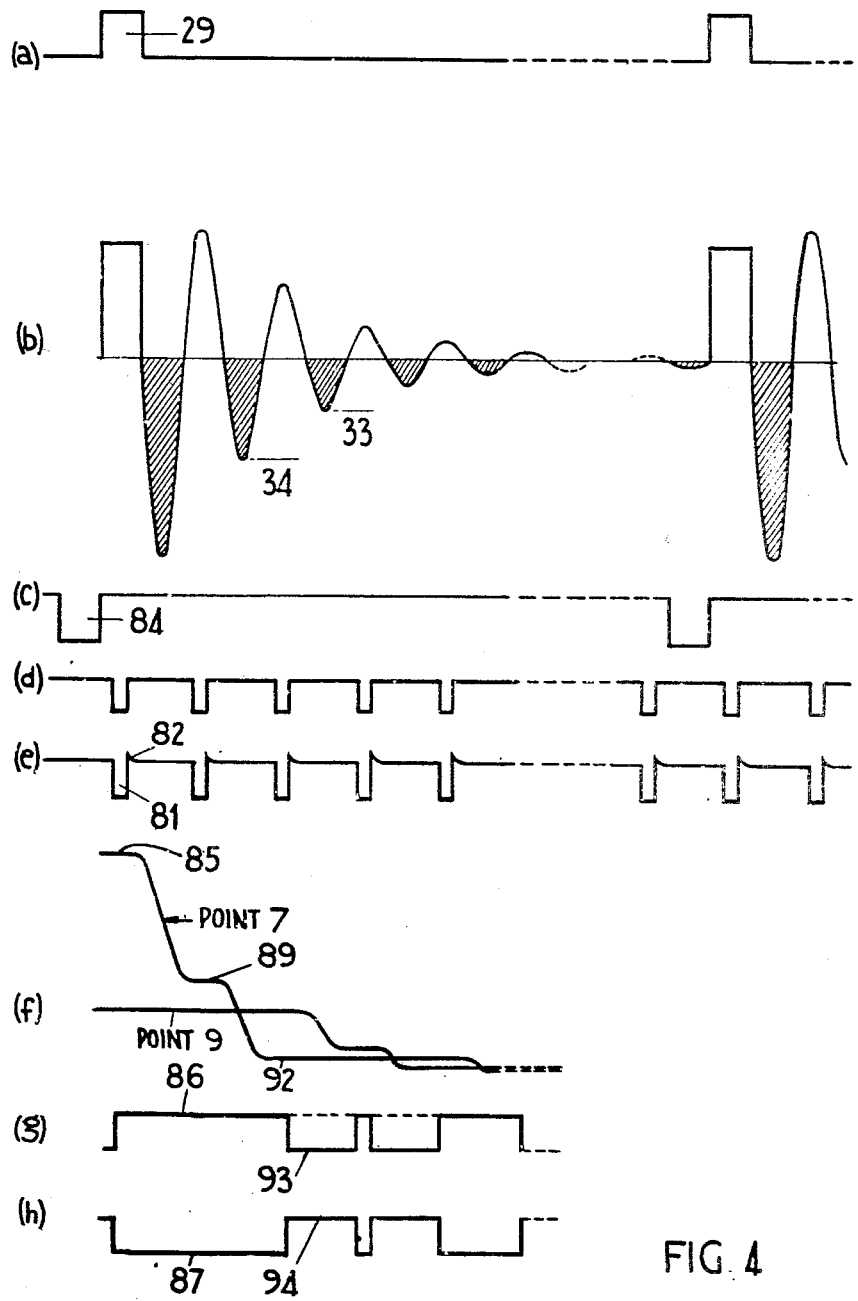

One example of apparatus in accordance with the present invention for generating a pulse code signal will now be described with reference to the four figures of the accompanying drawings in which Figure 1 shows diagrammatically the basic circuit of the apparatus, Figures 2 and 3 show the circuit of the apparatus in more detail, and are drawn so that when placed side by side they give the complete circuit of the apparatus, and Figure 4 shows a number of waveforms during a period slightly greater than that of one coding cycle, the waveforms (a) to (e), (g) and (h) being the waveforms produced at the points A to E, G and H respectively in Figures 2 and 3.

The basic circuit of the apparatus and its method of operation will first be considered with reference to Figure 1 of the accompanying drawings. The apparatus comprises two storage condensers 1 and 2 which constitute two integrator circuits. The signal to be coded is supplied to a terminal 3 and this signal is passed through a cathode follower stage 4. At the beginning of each coding cycle the voltage supplied by the cathode follower stage 4 is sampled by means of a clamp circuit 6 so that the point 7 is then at the sample voltage and the condenser 1 is appropriately charged. At the same time a clamp circuit 8 is operated so that the point 9 is earthed.

A pair of pentode thermionic valves 12 and 13 constitute a switch which is arranged to feed current pulses supplied by a generator 14 to either the condenser 1 or the condenser 2. During each coding cycle the waveform of the signal supplied by the generator 14 is a damped sine wave although only the negative-going pulses are actually utilised, each of these pulses after the first having one half the amplitude of the preceding pulse.

Prior to each of said negative-going pulses being supplied by the generator 14, a comparison circuit 15 is arranged to compare the instantaneous voltages across the condensers 1 and 2. In dependence upon each such comparison the control grids 16 and 17 of the valves 12 and 13 are biassed so as to allow the current pulse supplied by the generator 14 to flow through either the valve 12 or the valve 13. In fact the voltage on each of the grids 16 and 17 at any instant has one of only two possible values, and a pair of diode valves 18 and 19 are utilised for the purpose of direct current restoration.

The arrangement is such that each of the negative-going pulses supplied by the generator 14 is passed through the valve 12 or 13 to whichever of the points 7 or 9 has the higher potential. Over a complete coding cycle of a sample of the input signal this has the effect of reducing the difference between the voltages of the points 7 and 9 so that those voltages approach the same value.

The required pulse code signal is developed at a terminal 21 and this signal is in fact one of the outputs from the comparison circuit 15.

Parts of the circuit of Figure 1 will now be considered in more detail with reference to Figures 2, 3 and 4 of the accompanying drawings.

Referring first to Figure 2, the coding pulse generator 14 comprises a pentode thermionic valve 25 and a tuned circuit 26. At the beginning of each coding cycle a positive-going pulse is supplied to a terminal 27 which is connected to the control grid 28 of the valve 25 with the result that the tuned circuit 26 is excited. Thus, referring now to Figure 4, the application of a pulse 29 to the terminal 27 causes the generator 14 to supply the signal having the damped waveform shown in Figure 4(b) at the point 31. The component values of the circuit 26 and the value of resistance of the resistor 32 are such that the amplitude 33, for example, is one half that of the amplitude 34. The resistor 32 is also chosen so that the current pulses supplied by the generator 14 through the valves 12 and 13 to the condensers 1 and 2 are of the required magnitude for coding.

It will be appreciated that only the shaded portions of the waveform of Figure 4(b) are in fact used for coding. A diode valve 35 is provided for the purpose of preventing the cathodes 36 and 37 of the valves 12 and 13 rising above the voltage at the point 38 which is a few volts above that of the negative supply line 39. The valve 35 also serves to maintain constant the damping on the tuned circuit 26 during both positive and negative half cycles of the signal supplied by the generator 14.

The clamping circuits 6 and 8 include coils 41 and 42 which have a common magnetic core 43. As already mentioned, the clamping circuit 6 is arranged periodically to sample the input signal supplied through the cathode follower stage 4 and charge the condenser 1 accordingly while simultaneously the clamp circuit 8 is arranged to discharge the condenser 2. For this purpose a negative-going pulse is supplied to the terminal 44 with the result that all the diode valves 45, 46 and 47, 48 are rendered momentarily conducting. The waveform of the signal supplied to the terminal 44 is shown in Figure 4(c). A potentiometer 49 is provided for the purpose of varying the standing voltage supplied by the cathode follower stage 4.

The comparison circuit 15 which compares the instantaneous voltages across the condensers 1 and 2 is shown more fully in Figure 3 of the accompanying drawings and the operation of this slicer is described in co-pending United States patent application Serial No. 413,909, filed March 3, 1954, for Apparatus for Comparing the Instantaneous Values of Two Voltages. The voltages developed at the points 7 and 9 are in fact supplied to the control grids 51 and 52 respectively of a pair of triode thermionic valves 53 and 54. The two valves 53 and 54 are constituted by a single double triode valve 55 and have a common cathode circuit, the valves 53 and 54 each having a relatively short grid base. The arrangement is such that the anode voltage of the valve 53 is dependent upon the difference between the instantaneous voltages at the points 7 and 9 and can only vary over a small range of values compared with the range of possible voltages across the condensers 1 and 2. Thus, although the anode voltage of the valve 53 is dependent upon this voltage difference, it is substantially independent of the actual values of voltage across either of the condensers 1 and 2. It is necessary that the resistance in the common cathode circuit of the valves 53 and 54 shall be relatively high and for this purpose a pentode thermionic valve 56 is provided in this cathode circuit.

The variation in anode voltage of the valve 53 constitutes a control voltage which is supplied to a cathode follower stage 57. A diode thermionic valve 58 is provided for the purpose of direct current restoration of the output from the cathode follower stage 57 and, in order that the valve 58 shall restore to the right level under all conditions, it is arranged so that the valve 56 is rendered non-conducting once during each coding cycle. For this purpose a signal having the waveform (c) is supplied to the terminal 59 which is connected to the suppressor grid 61 of the pentode valve 56.

The voltage developed across a resistor 62 is added to the output from the cathode follower stage 57 and the resultant voltage is applied to the control grid 63 of a pentode thermionic valve 64. The resistor 62 is connected in parallel with a diode thermionic valve 65 and is supplied from the secondary winding 66 of a pulse transformer 67. The valve 64 and another pentode thermionic valve 68 are provided with a common cathode resistor 69.

A steady bias is supplied to the control grid 71 of the valve 68 from a potentiometer 72 and the anode 73 of the valve 64 is effectively resistance-capacity coupled to the grid 71. In fact a cathode follower stage formed by a triode thermionic valve 74 and a resistor 75 is provided in this path between the anode 73 and the control grid 71, a diode thermionic valve 76 being arranged to operate in similar manner to the valve 58 whereby the more positive level of the voltage waveform supplied to the control grid 71 is determined by the potentiometer 72.

The circuit formed by the valves 64 and 68 has two states of operation in each of which one of the valves 64 or 68 is conducting and the other is cut off. This circuit is arranged to take up one or other of its two states in dependence upon whether the control voltage passed by the cathode follower stage 57 is or is not greater than the said bias voltage supplied to the grid 71. Each time a comparison of the voltages across the condensers 1 and 2 is to be effected, an interrogating pulse is supplied to the primary winding 77 of the pulse transformer 67. In fact a signal having the waveform of Figure 4(d) is supplied between the terminals 78 and 79 with the result that the voltage waveform across the resistor 62 is as shown in Figure 4(e).

Each negative-going pulse 81 causes the valve 64 to be cut off so that the circuit formed by the valves 64 and 68 takes up the state in which the valve 68 is conducting. Upon the cessation of each pulse 81 this circuit either remains in that state or changes over to its other state in dependence upon the relative value of the control voltage supplied by the cathode follower stage 57 and the bias supplied to the grid 71. Change-over from the state in which the valve 64 is cut off to that in which it is conducting is assisted by means of coupling through the valve 74. In order to prevent the circuit formed by the valves 64 and 68 changing over from one state to the other between successive pulses 81, the waveform of Figure 4(e) has a small positive-going pip 82 at the end of each pulse 81.

The bias supplied to the control grid 71 of the valve 68 is adjusted by means of the potentiometer 72 so that when the voltages across the condensers 1 and 2 are the same there is an equal chance of the circuit formed by the valves 64 and 68 taking up either of its two states after a pulse 81.

The anode voltages of the valves 64 and 68 provide switching signals which are fed to the control grids 16 and 17 respectively of the valves 12 and 13 (see Figure 2). In fact the first of these switching signals is taken from across the resistor 75 and is substantially the same as the voltage on the anode 73 by virtue of the action of the cathode follower stage formed by the valve 74. The voltage across the resistor 75 is also fed through a condenser 83 to the output terminal 21, the cathode follower stage formed by the valve 74 acting as a buffer stage between the output terminal 21 and the valve 64.

The operation of the apparatus described above during the coding of a single sample of an input signal will now be considered with particular reference to the waveforms (f), (g) and (h) of Figure 4. Referring first to Figure 4(f) which shows the voltages of the points 7 and 9, the clamp circuit 6 is operated upon the occurrence of the pulse 84 to raise the voltage of the point 7 to the level 85 while the clamp circuit 8 is operated to earth the point 9. It will be appreciated that by means of the clamp circuit 6 the point 7 may be brought to a voltage which is either greater than or less than earth potential in dependence upon whether the instantaneous value of the input signal is greater or less than zero at the instant of sampling.

Upon the cessation of the pulse 81, the comparison circuit 15 determines that the voltage on the point 7 is more positive than that on the point 9 and accordingly the signals supplied by the slicer 15 have the levels 86 and 87 respectively as shown in waveforms (g) and (h) of Figure 4. This causes the valve 13 to be cut off but the valve 12 to be biassed so that the current pulse from the generator 14 having a waveform substantially identical with the shaded portion 88 of Figure 4(a) is passed through the valve 12 to the condenser 1. The voltage at the point 7 is thus reduced to the level 89. During the following half cycle of the waveform of Figure 4(a) the comparison circuit 15 again compares the voltages on the points 7 and 9 with the result that the valves 12 and 13 are biassed as previously and the current pulse resulting from the shaded portion 91 of Figure 4(a) is again supplied to the condenser 1. This causes the voltage on the point 7 to drop to the level 92 and the result of the next comparison by the comparison circuit 15 shows that the level 92 is below the voltage of the point 9 so that the signals supplied by the comparison circuit 15 then have the levels 93 and 94. The bias on the valves 12 and 13 is thus reversed with the result that the third current pulse from the generator 14 is supplied to the condenser 2.

It will be appreciated that Figure 4(g) shows the waveform of the pulse code signal developed at the terminal 21 and thus, of the first three pulse time positions associated with the sample under consideration, pulses occur at the first two but not at the third. This coding process may be repeated a number of times to give the required accuracy of coding although in Figure 4 only the waveforms of a five-digit code are shown.

In one construction of apparatus described above the pulses 29 and 84 of the waveforms (a) and (c) of Figure 4 each have a duration of one half micro-second and a spacing of 9½ micro-seconds. In the period between two successive pulses 29 there are ten negative-going half cycles of the waveform of Figure 4(b) although the last of these is wasted so that a nine-digit code is produced.

It will be appreciated that for correct operation of the apparatus it is essential for the condensers 1 and 2 to have the same capacity. In order that the capacities may be adjusted to satisfy this condition, one or each of the condensers 1 and 2 may have a trimmer condenser connected in parallel with it.

In the present embodiment, the points 7 and 9 are brought to substantially the same voltage during a coding cycle. Alternatively they may be brought to voltages that have substantially a predetermined difference, the comparison circuit 15 then being arranged to determine whether the difference between the instantaneous voltages on those points is greater or less than the predetermined value.

If the apparatus is required to code samples of a plurality of channels in turn, the signal supplied to the input terminal 3 may be of the pulse amplitude modulated type in which pulses representing the sample amplitudes of the several channels are combined in time multiplex. The arrangement is then such that the clamp circuit 6 samples each of the amplitude modulated pulses in turn. The output signal developed at the terminal 21 then consists of groups of code pulses of the several channels occurring in time multiplex.

I claim:

1. Apparatus for generating a pulse code signal comprising first and second integrator circuits, means operable prior to coding to control the operating condition of the first integrator circuit so that the output thereof has a level dependent upon the instantaneous value of a signal to be coded, means operable prior to coding to control the operating condition of the second integrator circuit so that the output thereof has a predetermined level, means to generate a train of pulses which decrease in geometric progression with a common ratio of one half, means to compare the levels supplied by the first and second integrator circuits, and means to supply each pulse of said train selectively to one or other of said integrator circuits in dependence upon the result of the comparison effected by the last-mentioned means so that during a coding cycle the difference between the levels supplied by the integrator circuits approach a predetermined value, a pulse element of the generated signal being supplied in dependence upon the result of each comparison.

2. Apparatus according to claim 1 wherein each of said integrator circuits consists of storage capacity.

3. Apparatus according to claim 2 wherein the said means to supply each pulse of said train selectively to one or other of said capacities comprises a pair of grid-controlled thermionic valves through which the current pulses are arranged to be supplied to the two capacities respectively, these two valves being biased in dependence upon the comparison of the voltage levels across the two capacities.

4. Apparatus for generating a pulse code signal comprising first and second storage capacities, a clamp circuit to charge the first storage capacity to a voltage proportional to the instantaneous value of a signal to be coded, a clamp circuit to discharge the second storage capacity so that there is no voltage across it, a comparison circuit to compare the voltages across the first and second storage capacities, means to generate a train of current pulses in which the quantity of electricity of each pulse after the first is one half that of the preceding pulse, a first grid-controlled thermionic valve which is connected in a path through which is arranged to be passed the said current pulses to the first storage capacity when that valve is conducting, a second grid-controlled thermionic valve which is connected in the path through which is arranged to be passed the said current pulses to the second storage capacity when that valve is conducting, means selectively to cause either the first or the second valves to be conducting upon each of said current pulses being generated in dependence upon the preceding voltage comparison by the said comparison circuit so that during a coding cycle each of said current pulses is supplied selectively to either the first or the second capacity whereby during a coding cycle the difference in voltage across the two storage capacities approaches zero, and means to supply a pulse element of the generated signal in dependence upon the result of each comparison.

5. Apparatus for generating a pulse code signal according to claim 4 wherein the first and second thermionic valves are both pentode valves.

References Cited in the file of this patent

UNITED STATES PATENTS 2,592,061   Oxford _____ Apr. 8, 1952
2,641,740   Levy _____ June 9, 1953